June 21, 1960 P. B. ALLER ET AL 2,941,777
ALL TEMPERATURE HIGHLY DAMPED VIBRATION ISOLATOR
Filed Jan. 31, 1955

INVENTORS
PAUL B. ALLER
ARCHIE GOLD
BY
ATTORNEYS 2,941,777
Patented June 21, 1960

2,941,777
ALL TEMPERATURE HIGHLY DAMPED VIBRATION ISOLATOR

Paul B. Aller, Penn-Ambler Road, Ambler, Pa., and Archie Gold, 5380 Montgomery Ave., Philadelphia, Pa.

Filed Jan. 31, 1955, Ser. No. 485,357

5 Claims. (Cl. 248—358)

(Granted under Title 35, U.S. Code (1952), sec. 266)

The invention described herein may be manufactured and used by or for the Government of the United States of America for governmental purposes without the payment of any royalties thereon or therefor.

The present invention relates to an all temperature highly damped vibration isolator, and more particularly to an all temperature highly damped vibration isolator assembly effective in all directions as a vibration isolator, highly damped in all directions, and protected against shock loads in all directions, wherein all components are highly resistant to the adverse effects of extreme temperature changes.

Known means for resiliently mounting delicate objects such as electronic equipment to protect it from the adverse effects of severe vibration include a vibration isolator assembly which is highly damped, but is only effective as a vibration isolator along one axis, and a vibration isolator assembly designed to be effective about three mutually perpendicular axes as a vibration isolator, but not effectively damped to avoid the adverse effects of resonant frequencies of vibration.

The instant invention contemplates a highly damped vibration isolator assembly effective to protect delicate equipment mounted thereon at the relatively low vibration frequency ranges and under the wide variations in temperature conditions encountered in high speed aircraft.

An object of the present invention is the provision of a vibration isolator assembly effective as a vibration isolator about three mutually perpendicular axes.

Another object of this invention is to provide damping means for a vibration isolator assembly capable of effectively damping the vibration isolator assembly about three mutually perpendicular axes.

Still another object is the provision of snubbing means for a vibration isolator assembly simultaneously effective in both directions along three mutually perpendicular axes to protect a load supported by such vibration isolator assembly against excessive excursions under shock loads.

A final object is the provision of a vibration isolator assembly composed entirely of elements highly resistant to the adverse effects of wide temperature variations.

Figure 1:
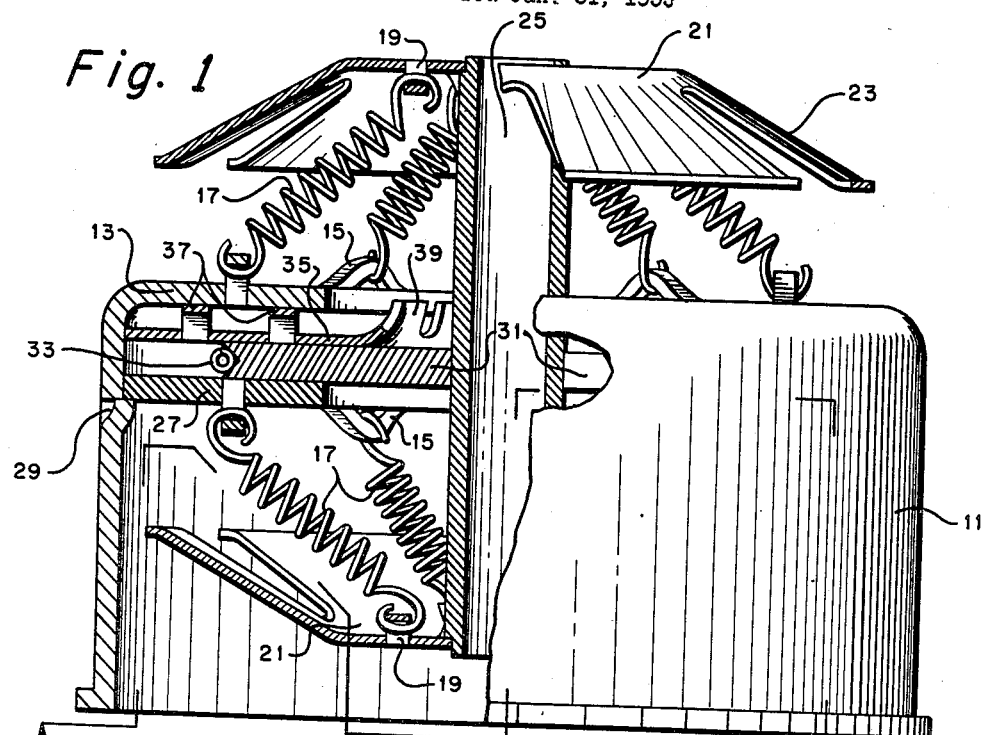
Figure 2:
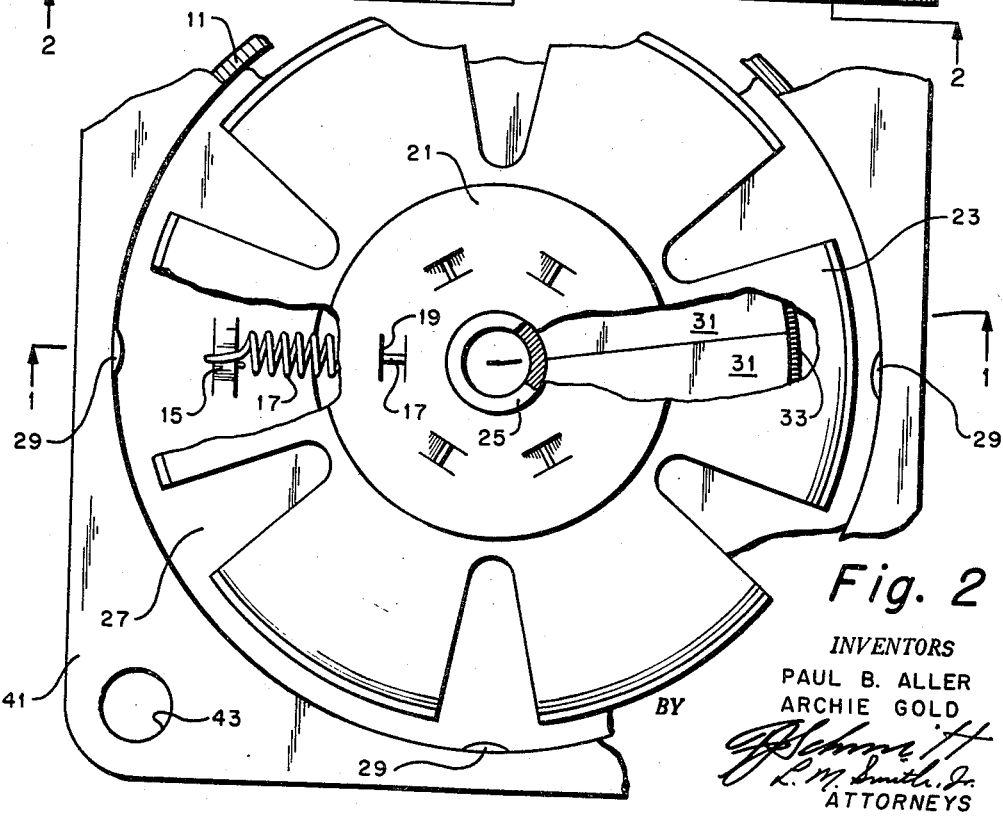

The exact nature of this invention as well as other objects and advantages thereof will be readily apparent upon consideration of the following specification relating to the annexed drawings in which:

Fig. 1 illustrates a side elevation, partially broken away, of a preferred embodiment of the instant invention, and Fig. 2 shows a bottom plan view, partially broken away, of the preferred embodiment of the instant invention illustrated in Fig. 1.

Referring now to the drawings, wherein like reference characters refer to like or corresponding parts in each of the several views, there is shown in Fig. 1, which illustrates a preferred embodiment, a supporting base or shell 11 shown in one suitable form as a hollow cylinder open at both ends provided with an inwardly extending flange or lip 13 shown formed integrally therewith at its upper end, a first plurality of attachment points 15 located at spaced intervals around the annular flange 13, a first plurality of suspension springs 17 each connected at one end to one of the attachment means 15 and at the other end to one of a plurality of attachment means 19 spaced about a first generally circular washer 21 having a plurality of radially disposed snubber fingers 23 located at spaced intervals about its outer periphery and extending toward the annular flange 13 of the shell 11, a load attachment element shown as an elongated hollow cylindrical mounting shaft 25 disposed concentrically of the shell 11 and fixedly secured at its upper end to the first washer 21 and at its lower end to a second washer 21 also provided with a plurality of attachment means 19 to which a second plurality of suspension springs are secured, and an annular retainer plate 27 supported within shell 11 by suitable means such as a plurality of inwardly projecting detents 29 to form a second inwardly extending flange spaced from flange 13 and provided with a plurality of spaced attachment means 15 mounted thereon or formed integrally therewith to which the opposite ends of the second plurality of suspension springs 17 are secured. Thus, these various elements are arranged to form the vibration isolator portion of the vibration isolator assembly comprising the instant invention. Fig. 1 also shows a damping means including a plurality of radially divided damping segments 31 of suitable frictional material unaffected by wide temperature variations such as metal or plastic sheet material or the like together forming a planar annular assembly continuously biased into engagement with the central portion of the mounting shaft 25 by a circular tension or garter spring 33 engaged in a suitable channel or groove in the outer periphery of the segments 31, and a unitary annular pressure spring member 35 provided with a spaced plurality of upwardly offset resilient fingers 37 continuously effective to bias said member into engagement with the damping segments 31 to exert a clamping action thereon in cooperation with the retainer plate 27. Thus, these elements of the device comprising the instant invention cooperate to form the damping portion thereof. The member 35 is also provided with a spaced plurality of inwardly extending arcuately curved snubbers 39 disposed about its inner periphery for engagement with the outer surface of said mounting shaft 25. Noting that both washers 21 supported by the mounting shaft 25 are provided with snubber fingers 23 arranged to engage the annular flange 13 or another element secured adjacent thereto upon shell 11 and noting further that the member 35, supported by shell 11, is provided with a plurality of snubbers 39, these snubbing means supported respectively by mounting shaft 25 and elements supported by shell 11, respectively, are arranged to engage elements supported by shell 11 and mounting shaft 25, respectively, to restrict relative displacement of the shell 11 and mounting shaft 25 and thereby form the snubbing portion of the instant invention.

Referring next to Fig. 2, this view shows an outwardly extending mounting flange 41 formed integrally with or attached securely to the lower edge of the shell 11 and provided with a plurality of openings 43 therethrough for the insertion of suitable attachment means such as screws or rivets, the second washer 21 with its plurality of radially disposed snubber fingers 23, shown broken away to disclose the relative disposition of a typical suspension spring 17 interconnecting attachment means 19 on the washer 21 and an attachment means 15 on the retainer plate 27, and a plurality of inwardly projecting detents 29 shown projecting inwardly from the inner surface of the shell 11 beyond the outer circumference of the retainer plate 27 to provide stable support therefor.

In operation, the device comprising the instant invention is fixedly secured by suitable attachment means inserted through openings 43 in the flange 41 of the shell 11 to a fixed support or frame, not shown, which is subjected to severe vibration. Delicate equipment, not shown, to be protected by the instant invention is secured in a well known manner to a plurality of units constructed according to the teachings of the instant invention by the insertion of bolts through the respective mounting shafts 25 of these units. As a matter of choice or convenience, the bolts may alternatively be secured in the mounting shafts either by threadable engagement with screw threads which may be provided on the inner surfaces of the mounting shafts or by suitable attachment means such as nuts threadably engaged with the bolts and engaging the ends of the mounting shafts. The vibration isolator portion of each of these units, including the washers 21 and the respective pluralities of suspension springs 17 by means of which they are attached through attachment means 15 and 19 to the shell 11 and the retainer plate 27 mounted therein, is effective about three mutually perpendicular axes to absorb vibrations transmitted to the shell 11 from the fixed support or frame to which it is fixedly secured. The damping portion of the respective units including the damping segments 31, the tension spring 33, and the pressure spring member 35 provides a continuously effective damping action effective about three mutually perpendicular axes to maintain the effectiveness of the vibration isolator portion of each unit through the resonant frequency range of this portion. The snubber fingers 23 on the respective washers 21 and the snubbers 39 on the member 35 together comprising the snubbing portion of the respective units provide protection against shock loads applied in either direction along any one of three mutually perpendicular axes.

While the vibration isolating means, the damping means, and the snubbing means of the instant invention have been characterized above as simultaneously effective about three mutually perpendicular axes this description is not intended to be restrictive. Rather, it follows from this relationship that their combined effect along these three axes so disposed renders them effective in any direction without restriction. In fact, in view of the cylindrical configuration of the instant invention with the various components thereof arranged symmetrically about the longitudinal axis of the mounting shaft, the vibration isolating means, the damping means, and the snubbing means may alternatively be described as simultaneously effective in both directions along one axis and in any direction in a plane perpendicular to this single axis.

Thus, the present invention provides a vibration isolator assembly simultaneously effective about three mutually perpendicular axes and in a range of frequencies in which no known device of this general type is adequate. Moreover, this invention is designed so that its parts may be made entirely of metal or suitable plastic material, the operation of which is not appreciably affected by extremely wide temperature variations.

Many modifications of the illustrative embodiment of the instant invention shown in Figs. 1 and 2 may be made to adapt this device to various operating conditions or to facilitate its fabrication. For example, the configuration of the shell 11 may be modified to conform to various types of bases and to meet weight and space limitations, the number and size of the suspension springs 17 may be varied to accommodate various load and vibration conditions, the support for the resilient fingers 37 and the snubbers 39 may be provided by separate elements instead of a single member as illustrated, the pressure spring member 35 and the resilient fingers 37 offset therefrom may be replaced by a resilient radially corrugated annular member, and the damping segments 31, shown as made of metal, may conveniently be fabricated from suitable temperature resistant plastic materials. Finally, the entire damping portion of this device including the damping segments 31, the garter spring 33, the pressure spring member 35, the resilient fingers 37, and the snubbers 39 may be replaced with a single annular element designed to perform the respective functions of these various parts.

Obviously, many modifications and variations of the present invention are possible in the light of the above teachings. It is, therefore, to be understood that within the scope of the appended claims the invention may be practiced otherwise than as specifically described.

What is claimed is:

1. A highly damped vibration isolator assembly including, in combination, an elongated mounting means, an inverted cup-shaped supporting base encompassing and symmetrically spaced from said mounting means, vibration isolating means comprising mutually opposed and balanced means interconnecting said supporting base and said mounting means and simultaneously effective about three mutually perpendicular axes, cooperating damping means interposed between said supporting base and said mounting means comprising elements continuously maintained in frictional engagement with said supporting base and said mounting means concurrently simultaneously effective about three mutually perpendicular axes, first snubbing means comprising resilient elements supported by said mounting means and so disposed as to engage said supporting base and said mounting means in either direction along any of three mutually perpendicular axes, and second snubbing means comprising resilient elements supported by said supporting base and so disposed as to engage said mounting means after predetermined relative displacement of said supporting base and said mounting means along any of two mutually perpendicular axes after said first snubbing means have engaged said supporting base.

2. A highly damped vibrator isolator assembly comprising, in combination, an inverted cup-shaped supporting base; an elongated mounting means disposed concentrically of and spaced from said supporting base; vibration isolator means including first and second attachment means fixedly secured to the opposite ends of said mounting means, a first plurality of generally radially disposed resilient suspension means connecting said supporting base to said first attachment means, and a second plurality of generally radially disposed resilient suspension means connecting said supporting base to said second attachment means and thereby opposing said first plurality of suspension means; generally annular damping means interposed between said supporting base and said mounting means continuously resiliently biased into frictional engagement with said supporting means and with said mounting means; and snubbing means including a first plurality of resilient snubbing elements projecting radially from each of said first and second attachment means and toward the periphery of said supporting base, and a second plurality of resilient snubbing elements adjacent to and above said damping means and extending toward said mounting means to restrain the relative displacement of said supporting base and said mounting means after a predetermined relative displacement thereof and after said first plurality of resilient snubbing elements has engaged said mounting means.

3. A highly damped vibration isolator assembly comprising, in combination, a generally cylindrical supporting base, a pair of spaced parallel inwardly extending annular members connected to said supporting base; an elongated mounting means disposed concentrically of and spaced from said supporting base, vibration isolator means including a first and a second plurality of generally radially extending mutually opposed and balanced resilient elements interconnecting the respective said annular members of said supporting base and the respective ends of said mounting means, said resilient elements being simultaneously effective about three mutually perpendicular axes, generally annular damping means interposed between said supporting base and said mounting means including a plurality of radially divided damping segments disposed between said anular members of said supporting base and encircling said mounting means, circular biasing means engaging the outer periphery of said damping segments and continuously effective to bias said damping segments into frictional engagement with said mounting means, a resilient annular biasing member encircling said mounting means and disposed adajacent said damping segments arranged to engage one of said annular members of said supporting base for biasing said damping segments into continuous frictional engagement with the other one of said annular members of said supporting base, said damping means being continuously effective about three mutually perpendicular axes, and snubbing means including a plurality of first resilient snubbing elements radially extending from each end of said mounting means toward the nearest of said annular members for engagement therewith after a predetermined axial displacement of said mounting means in either direction, and a plurality of second resilient snubbing elements supported by said supported base and extending radially inwardly towards said mounting means for engagement with said mounting means upon predetermined radial displacement of said mounting means relative to said supporting base and thereby cooperates with said first resilient snubbing elements against relative radial movement between said mounting means and said supporting base.

4. A highly damped vibration isolator assembly comprising, in combination, a generally circular supporting base, a pair of spaced parallel inwardly extending annular members connected to said supporting base, an elongated hollow cylindrical mounting shaft disposed concentrically of and spaced from said supporting base, vibration isolator means including first and second generally cylindrical washers fixed to the opposite ends of said mounting shaft, a first plurality of generally radially disposed resilient suspension means connecting one of said annular members to said first washer, and a second plurality of generally radially disposed resilient suspension means connecting the other of said annular members to said second washer in opposition to said first plurality of suspension means, generally annular damping means interposed between said supporting base and said mounting shaft including a plurality of radially divided damping segments disposed between said annular members of said supporting base and encircling said mounting shaft, a circular spring self-biased into engagement with the outer periphery of said damping segments and continuously biasing said damping segments into engagement with said mounting shaft, a resilient annular pressure spring member disposed between said annular members adjacent said damping segments and arranged to engage one of said annular members of said supporting base in order to bias said damping segments into frictional engagement with the other of said annular members of said supporting base, and snubbing means including a first plurality of resilient elements together forming a generally conical extension of each of said washers, each of said washers being arranged to engage the nearest of said annular members after predetermined relative displacement theretowards, a second plurality of resilient elements projecting radially inwardly from said pressure spring member for engagement with said mounting shaft upon radial displacement of said mounting shaft relative to said supporting base, and said first plurality of resilient elements of one of said washers being adapted to cooperate with said second plurality of resilient elements in resisting further relative radial displacement after predetermined radial displacement of said mounting shaft relative to said supporting base.

5. A highly damped vibration isolator assembly comprising, in combination, a generally circular supporting base comprising a cylindrical shell and first and second spaced parallel inwardly extending annular members supported by said cylindrical shell, an elongated hollow cylindrical mounting shaft disposed concentrically of said supporting base and extending equidistantly beyond the respective annular members of said supporting base, vibration isolator means including first and second washers fixed to the opposite ends of said mounting shaft, each of said first and second washers having spaced attachment means, a first plurality of elongated radially extending resilient suspension members connecting said spaced attachment means of said first washer to said first annular member, a second plurality of elongated radially extending resilient suspension means connecting said spaced attachment means of said second washer to said second annular member, annular damping means interposed between said supporting base and said mounting shaft including a plurality of peripherally grooved radially-divided planar damping segments disposed between said annular members of said supporting base and collectively encircling said mounting shaft, a circular spring disposed in the peripheral groove of said damping segments and biasing said damping segments into engagement with said mounting shaft, a generally flat resilient annular pressure spring member disposed between said annular members and having a spaced plurality of resilient offset portions continuously biased into engagement with said first annular member and thereby rendering said pressure spring member continuously effective to bias said damping segments into frictional engagement with said second annular member, and snubbing means including a first plurality of resilient elements together forming a generally conical extension of each of said first and second washers and arranged to engage the nearest of said annular members after predetermined relative displacement of one of said washers theretowards, and a second plurality of resilient elements projecting radially inwardly from said pressure spring member for engagement with said mounting shaft upon predetermined radial displacement of said mounting shaft toward the respective resilient elements, said first and second plurality of resilient elements coacting to resist further radial displacement of said mounting shaft relative to said supporting base after predetermined relative radial displacement of said mounting shaft and said supporting base, whereby said vibration isolator assembly is rendered continuously effective against shock loads and resonant frequencies along three mutually perpendicular axes.

References Cited in the file of this patent

UNITED STATES PATENTS

| | | |
|---|---|---|
| 2,600,090 | Barber et al. | June 10, 1952 |
| 2,683,016 | Campbell | July 6, 1954 |
| 2,688,479 | Barbera | Sept. 7, 1954 |
| 2,838,267 | Wells | June 10, 1958 |